(12) United States Patent
Karampatsis et al.

(10) Patent No.: US 12,127,278 B2
(45) Date of Patent: Oct. 22, 2024

(54) UNICAST SESSION OVER A DIRECT COMMUNICATION LINK

(71) Applicant: Lenovo (Singapore) PTE. LTD., New Tech Park (SG)

(72) Inventors: Dimitrios Karampatsis, Ruislip (GB); Prateek Basu Mallick, Dreieich (DE); Joachim Loehr, Wiesbaden (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/582,994

(22) Filed: Jan. 24, 2022

(65) Prior Publication Data

US 2022/0150315 A1 May 12, 2022

Related U.S. Application Data

(63) Continuation of application No. 16/866,090, filed on May 4, 2020, now Pat. No. 11,234,281.

(60) Provisional application No. 62/842,406, filed on May 2, 2019.

(51) Int. Cl.
*H04W 76/14* (2018.01)
*H04L 12/18* (2006.01)
(Continued)

(52) U.S. Cl.
CPC .......... *H04W 76/14* (2018.02); *H04L 12/185* (2013.01); *H04W 4/40* (2018.02); *H04W 72/40* (2023.01); *H04W 92/18* (2013.01)

(58) Field of Classification Search
CPC ......... H04L 61/00; H04L 69/14; H04L 12/18; H04L 12/1845; H04L 12/185; H04W 8/26;
(Continued)

(56) References Cited

U.S. PATENT DOCUMENTS 11,234,281 B2 * 1/2022 Karampatsis ......... H04W 76/11
11,483,734 B2 * 10/2022 Lee ....................... H04W 76/11
(Continued)

OTHER PUBLICATIONS

Qualcomm Incorporated, Intel, "PC5 QoS parameters and standardized PQI definitions for eV2X", SA WG2 Meeting #132 S2-1904448, Apr. 8-12, 2019, pp. 1-9.
(Continued)

*Primary Examiner* — Thomas R Cairns
(74) *Attorney, Agent, or Firm* — Kunzler Bean & Adamson

(57) ABSTRACT

Apparatuses, methods, and systems are disclosed for determining whether an active unicast session can be re-used. One apparatus includes a transceiver and a processor that receives, e.g., from an internal application or operating system, a first request to establish a unicast session over a direct communication link to a first UE. Here, the first request indicates a source application-layer identifier of the apparatus and a target application-layer identifier of the first UE. The processor determines whether an active unicast session between the source application-layer identifier and the target application-layer identifier already exists. If an active unicast session between the source application-layer identifier and the target application-layer identifier already exists, then the processor re-uses the already-existing active unicast session. Otherwise, the processor establishes a new unicast session between the apparatus and the first UE.

20 Claims, 8 Drawing Sheets

(51) Int. Cl.
*H04W 4/40* (2018.01)
*H04W 72/40* (2023.01)
*H04W 92/18* (2009.01)

(58) Field of Classification Search
CPC ..... H04W 76/11; H04W 76/14; H04W 84/18; H04W 88/04; H04W 92/18; H04W 4/40–48; H04W 8/005; H04W 76/15; H04W 76/23; H04W 4/06; H04W 4/08; H04W 72/02; H04W 72/04; H04W 72/12; H04W 72/121; H04W 72/25; H04W 72/40
See application file for complete search history.

(56) References Cited

U.S. PATENT DOCUMENTS

| | | | | |
|---|---|---|---|---|
| 2020/0344574 | A1* | 10/2020 | Park | H04L 1/0072 |
| 2020/0351032 | A1* | 11/2020 | Wu | H04W 72/56 |
| 2021/0211870 | A1 | 7/2021 | Perras et al. | |
| 2021/0219105 | A1 | 7/2021 | Fan et al. | |
| 2022/0094466 | A1* | 3/2022 | Uchiyama | H04L 1/0017 |
| 2022/0103309 | A1* | 3/2022 | Lee | H04L 1/00 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, pp. 1-948.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V0.3.0, Apr. 2019, pp. 1-40.

Samsung, PC5 Unicast, SA WG2 Meeting #132 S2-1904441, Apr. 8-12, 2019, pp. 1-3.

Lenovo, Motorola Mobility, Re-using an Existing Unicast Link for Multiple V2 Services, May 13-17, 2019, pp. 1-7.

\* cited by examiner

UNICAST SESSION OVER A DIRECT COMMUNICATION LINK

CROSS-REFERENCE TO RELATED APPLICATIONS

This application claims priority to U.S. Provisional Patent Application No. 62/842,406 entitled "Unicast Session over a Direct Communication Link" and filed on May 2, 2019 for Dimitrios Karampatsis, Prateek Basu Mallick, and Joachim Loehr, which application is incorporated herein by reference.

FIELD

The subject matter disclosed herein relates generally to wireless communications and more particularly relates to conveying unicast sessions over a direct communication link.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Absolute Radio Frequency Channel Number ("ARFCN"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Dedicated Short Range Communication ("DSRC"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Discontinuous Transmission ("DTX"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MIME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop ("NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Cell Identity ("PCI"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X communication is supported using unicast communication over PC5. However, as of 3GPP Release 15, no link layer mechanism exists for unicast communications over PC5.

BRIEF SUMMARY

Disclosed are procedures for determining whether an active unicast session can be re-used. One method of a UE, e.g., for determining whether an active unicast session can be re-used, includes receiving, from an internal application (e.g., a V2X application or OS running on the source UE), a first request to establish a unicast session over a direct communication link to a target UE (i.e., a second UE). Here, the first request indicates a source application-layer identifier of the source UE and a target application-layer identifier of the target UE. The first method includes determining whether an active unicast session between the source application-layer identifier and the target application-layer identifier already exists. If an active unicast session between the source application-layer identifier and the target application-layer identifier already exists, then the first method includes re-using the already-existing active unicast session between the source UE and the target UE. Otherwise, if an active unicast session between the source application-layer identifier and the target application-layer identifier does not already exist, then the first method includes establishing a new unicast session between the source UE and target UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
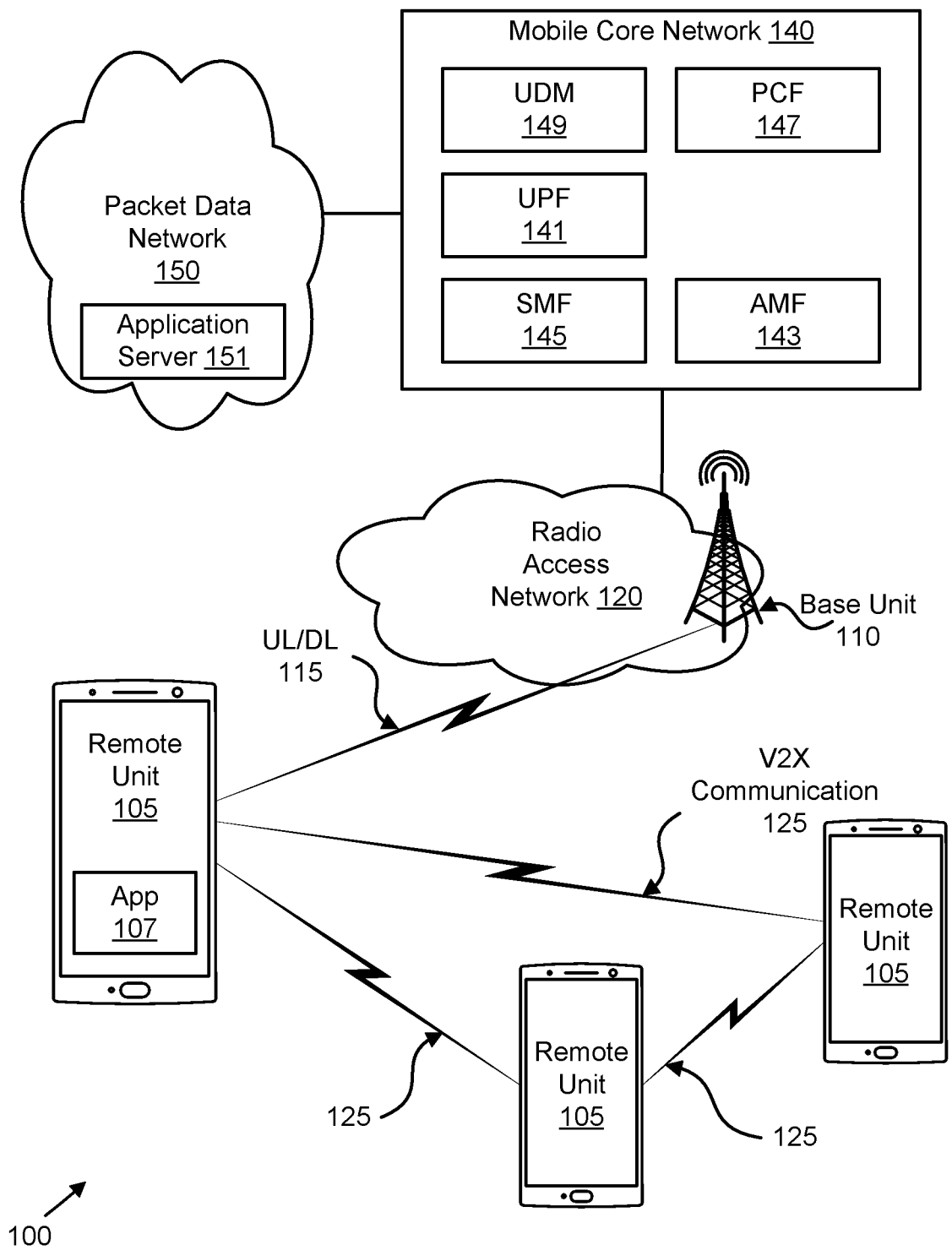
FIG. 1 is a schematic block diagram illustrating one embodiment of a wireless communication system for determining whether an active unicast session can be re-used.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for determining whether an active unicast session can be re-used for UEs engaged in V2X communication. It is currently unclear how the Source UE determines that a unicast session is sent to the same Target UE. For example, a Source UE may support different V2X services, each V2X service requiring the Source UE to initiate a unicast session. In 3GPP Rel-15, the Source and Target UEs uses different Layer-2 IDs for each V2X service. Therefore, it is not possible in 3GPP Rel-15 to identify from the Layer-2 IDs if the message is sent to the same Target UE.

If the Source UE knows a unicast message is sent to the same Target UE, then the Source UE may: 1) Send the unicast session over the same RRC connection and 2) Send the V2X message over the same unicast link. The present disclosure describes solutions on how UEs operating multiple V2X services can discover that a V2X message over unicast direct communication is sent to the Target UE.

FIG. 1 depicts a wireless communication system 100 for conveying unicast sessions over a direct communication link via V2X communication signals 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AW") 143 that serves the RAN 120, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for sidelink HARQ operation in NR V2X communication apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to a NR UE-scheduled V2X communication mode. Mode-3 corresponds to an LTE network-scheduled V2X communication mode. Mode-4 corresponds to an LTE UE-scheduled V2X communication mode.

Unicast mode of communication is currently supported only over NR based PC5 reference point. When Application layer (in a first UE, "UE-A") initiates a V2X service which requires PC5 unicast communication, the UE-A establishes a PC5 unicast link with the corresponding UE ("UE-B").

After successful PC5 unicast link establishment, UE-A and UE-B use a same pair of Layer-2 IDs for subsequent PC5-S signaling message exchange and V2X service data transmission, e.g., as specified in 3GPP TS 23.287, clause 5.6.1.4 (v0.3.0). The V2X layer of the transmitting UE indicates to the AS layer whether the message is for PC5-S signaling message (e.g., Direct Communication Accept, Link Layer Identifier Update Request/Response, Disconnect Request/Response) or service data transmission when it sends message over the established PC5 link. The V2X layer of receiving UE handles message if it is PC5-S signaling message while the V2X layer of receiving UE forwards the message to the upper layer if it is application data message.

Note that unicast mode supports per-flow QoS model. During the unicast link establishment, each UE self-assigns a PC5 Link Identifier and associates the PC5 Link Identifier with the Unicast Link Profile for the established unicast link. The PC5 Link Identifier is a unique value within the UE. The Unicast Link Profile identified by PC5 Link Identifier includes the application layer identifier and Layer-2 ID of UE A, the application layer identifier and Layer-2 ID of UE B and a set of PC5 QoS Flow Identifier(s) ("PFI(s)"). Each PFI is associated with QoS parameters (e.g., PQI and optionally Range).

The PC5 Link Identifier and PFI(s) are unchanged values for the established unicast link regardless of the change of application layer identifier and Layer-2 ID. A UE uses PFI to indicate the PC5 QoS flow to AS layer, therefore AS layer identifies the corresponding PC5 QoS flow even if the source and/or destination Layer-2 IDs are changed, e.g., due to privacy support. The UE uses PC5 Link Identifier to indicate the PC5 unicast link to V2X Application layer, therefore V2X Application layer identifies the corresponding PC5 unicast link even if there are more than one unicast link associated with one service type (e.g., the UE establishes multiple unicast links with multiple UEs for a same service type).

In some embodiments, a remote unit 105 re-uses an existing unicast session for multiple V2X services between the same pair of UEs, as described below in further detail with reference to FIGS. 4A-4B. In some embodiments, a remote unit 105 re-uses the same RRC connection to convey multiple unicast sessions over the same pair of UEs, as described below in further detail with reference to FIGS. 5A-5B.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for Sidelink Communication over PC5 interface.

Figure 2:
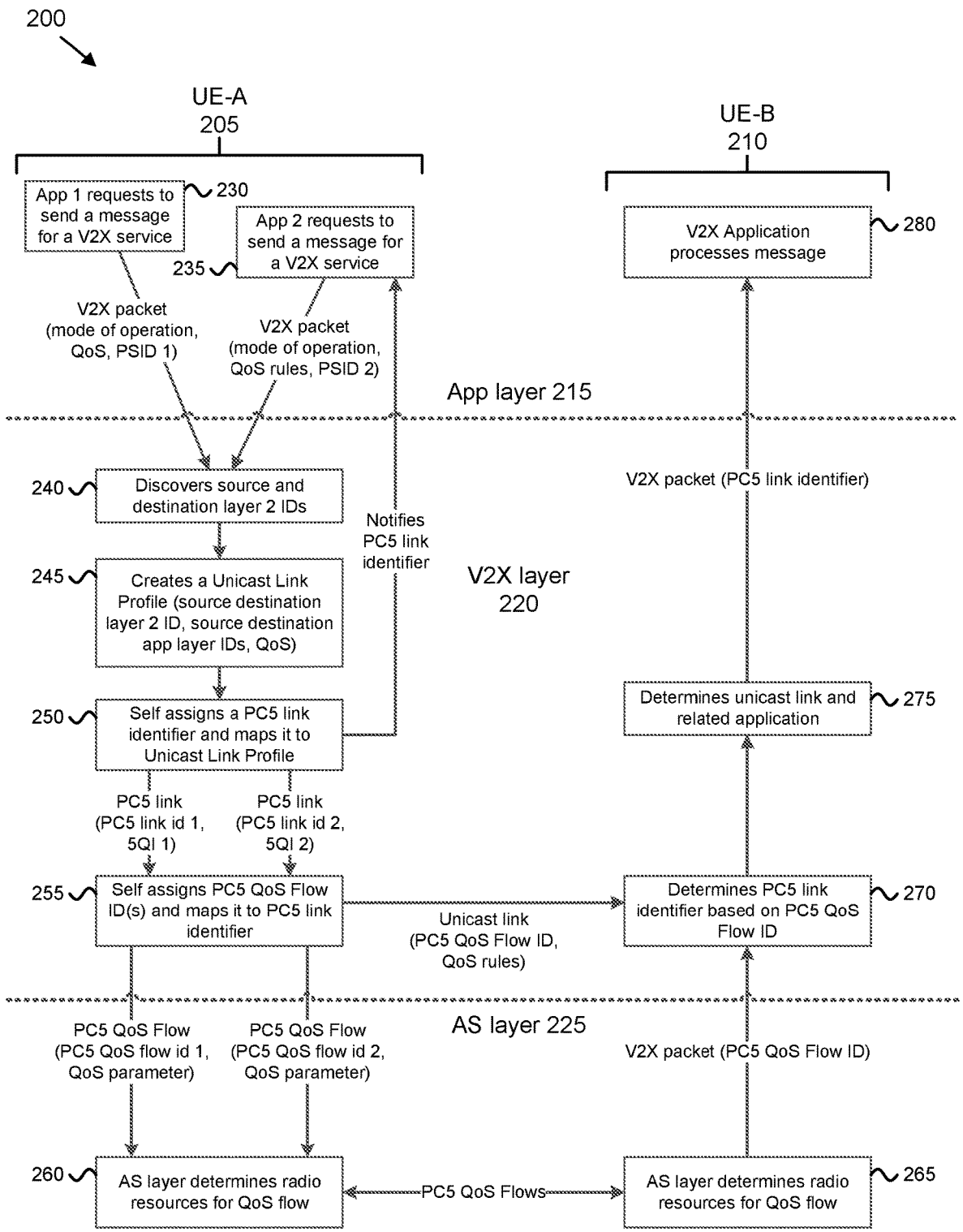
FIG. 2 is a diagram illustrating one embodiment of procedure for determining whether an active unicast session can be re-used.

FIG. 2 depicts a procedure 200 for unicast link establishment over the PC5 reference point, according to embodiments of the disclosure. Note that the PC5 reference point may be referred to herein as the "PC5 interface." The procedure 200 involves a first UE ("UE-A") 205 and a second UE ("UE-B") 210 that communicate over the PC5 reference point. Each UE is one embodiment of the remote unit 105 described above. Each UE includes an application layer 215 with one or more Applications, a V2X layer 220 and an access-stratum ("AS") layer 225.

Unicast mode of communication is currently supported only over NR-based PC5 reference point. When Application layer 215 in the UE-A 205 initiates a V2X service which requires PC5 unicast communication, the source UE-A 205 establishes a PC5 unicast link with the corresponding target UE-B 210.

After successful PC5 unicast link establishment, UE-A 205 and UE-B 210 use a same pair of Layer-2 IDs for subsequent PC5-S signaling message exchange and V2X service data transmission, e.g., as specified in 3GPP TS 23.287, clause 5.6.1.4 (v0.3.0). The V2X layer 220 of the source/transmitting UE 205 indicates to the AS layer 225 whether the message is for PC5-S signaling message (e.g., Direct Communication Accept, Link Layer Identifier Update Request/Response, Disconnect Request/Response) or service data transmission when it sends message over the established PC5 link. The V2X layer 220 of the target/receiving UE-B 210 handles message if it is PC5-S signaling message while the V2X layer 220 of the UE-B 210 forwards the message to the upper layer (i.e., application layer 215) if it is an application data message.

Note that unicast mode supports per-flow QoS model. During the unicast link establishment, each UE 205-210 self-assigns a PC5 Link Identifier and associates the PC5 Link Identifier with the Unicast Link Profile for the established unicast link. The PC5 Link Identifier is a unique value within the UE. The Unicast Link Profile identified by PC5 Link Identifier includes the application layer identifier and Layer-2 ID of UE-A 205, the application layer identifier and Layer-2 ID of UE B and a set of PC5 QoS Flow Identifier(s) ("PFI(s)"). Each PFI is associated with QoS parameters (e.g., PQI and optionally Range).

Per 3GPP Rel-15, the PC5 Link Identifier and PFI(s) are unchanged values for the established unicast link regardless of the change of application layer identifier and Layer-2 ID. A UE 205-210 uses PFI to indicate the PC5 QoS flow to the AS layer 225, therefore the AS layer 225 identifies the corresponding PC5 QoS flow even if the source and/or destination Layer-2 IDs are changed, e.g., due to privacy support. The UE 205, 210 uses the PC5 Link Identifier to indicate the PC5 unicast link to the V2X Application layer 215, therefore the V2X Application layer 215 identifies the corresponding PC5 unicast link even if there are more than one unicast link associated with one service type (e.g., a UE may establish multiple unicast links with multiple UEs for a same service type).

In order to allow a UE operating multiple V2X services (e.g., UE-A 205, as depicted) to discover whether a V2X message over unicast direct communication is sent to the same target UE (e.g., UE-B 210), the source UE 205 may re-use an existing unicast session for multiple V2X services between the same pair of UEs, as described below in further detail with reference to FIG. 3 and FIGS. 4A-4B. In certain embodiments, the source UE 205 may re-use the same RRC connection to convey multiple unicast sessions over the same pair of UEs, as described below in further detail with reference to FIGS. 5A-5B. In some embodiments, the source UE-A 205 may create a unicast link identifier ("ULI"), where the UE-A 205 and UE-B 210 use the unicast link identifier to discover whether a V2X message over unicast direct communication is sent to the same target UE. Here, the PC5-RNTI may be created based on the unicast link identifier. In certain embodiments, the unicast link identifier may be a combination of source Application-Layer ID and target Application-Layer ID.

Figure 3:
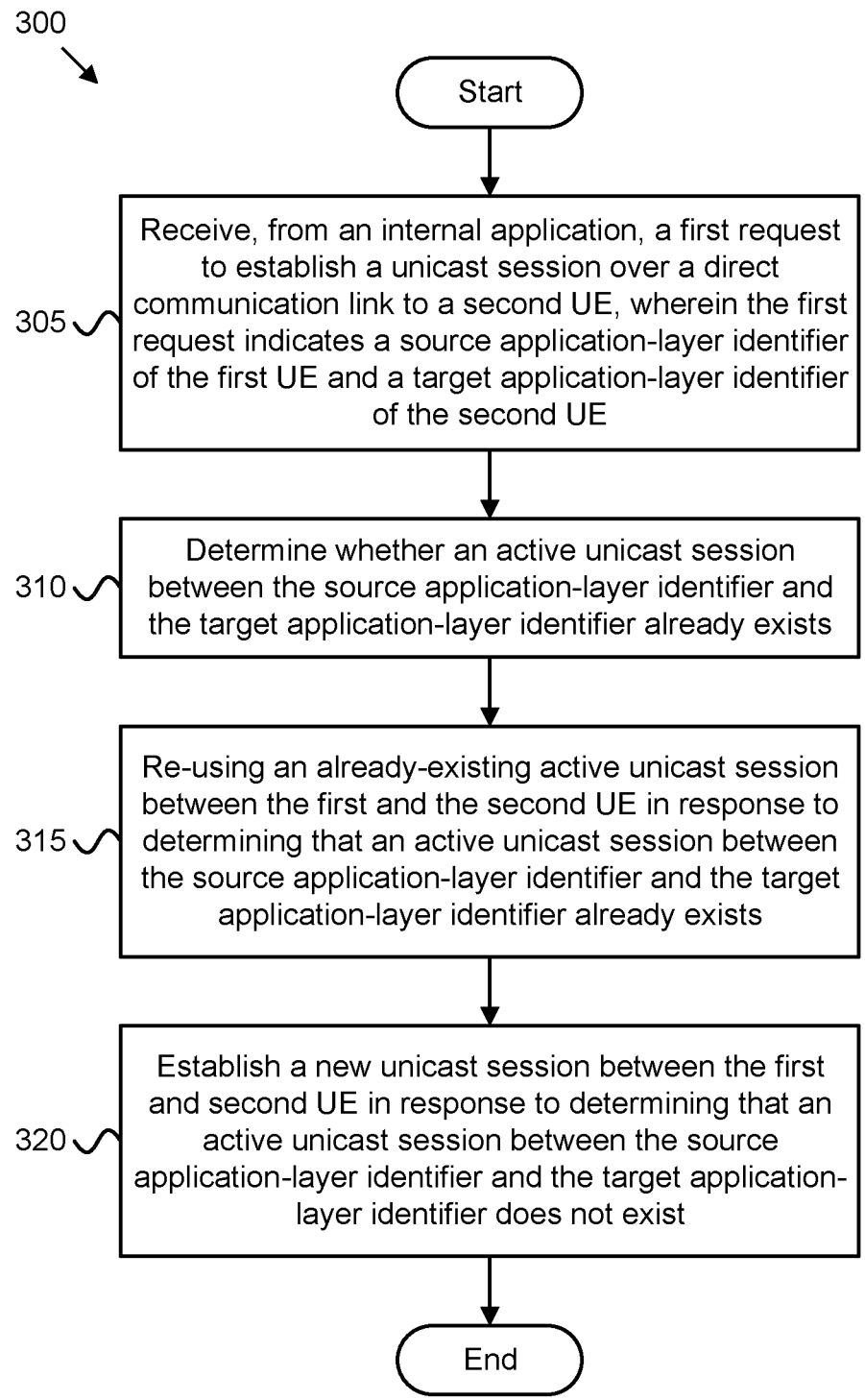
FIG. 3 is a flowchart diagram illustrating one embodiment of a method that may be used for determining whether an active unicast session can be re-used.

FIG. 3 depicts one embodiment of a method 300 for determining whether an active unicast session can be re-used, according to embodiments of the disclosure. In various embodiments, the method 300 is performed by a UE, such as the remote unit 105 described above, the UE-A 205 described above, the source UE 405 described below, and/or the user equipment apparatus 600, described below. In some embodiments, the method 300 is performed by a processor, such as a microcontroller, a microprocessor, a central processing unit ("CPU"), a graphics processing unit ("GPU"), an auxiliary processing unit, a field programmable gate array ("FPGA"), or the like.

The method 300 begins and receives 305, from an internal application (e.g., a V2X application or OS running on the source UE), a first request to establish a unicast session over a direct communication link to a target UE (i.e., a second UE). Here, the first request indicates a source application-layer identifier of the source UE and a target application-layer identifier of the target UE. Further details of the first request are described below.

The method 300 includes determining 310 whether an active unicast session between the source application-layer identifier and the target application-layer identifier already exists. Further details of determining whether an active unicast session exists are described below The method 300 includes re-using 315 an already-existing active unicast session between the source UE and the target UE in response to determining that an active unicast session between the source application-layer identifier and the target application-layer identifier already exists. Further details of re-using an existing unicast session are described below.

Otherwise, the method 300 includes establishing 320 a new unicast session between the source UE and target UE in response to determining that an active unicast session between the source application-layer identifier and the target application-layer identifier does not exist. Further details of establishing a new unicast session are described below. The method 300 ends.

Figure 4A:
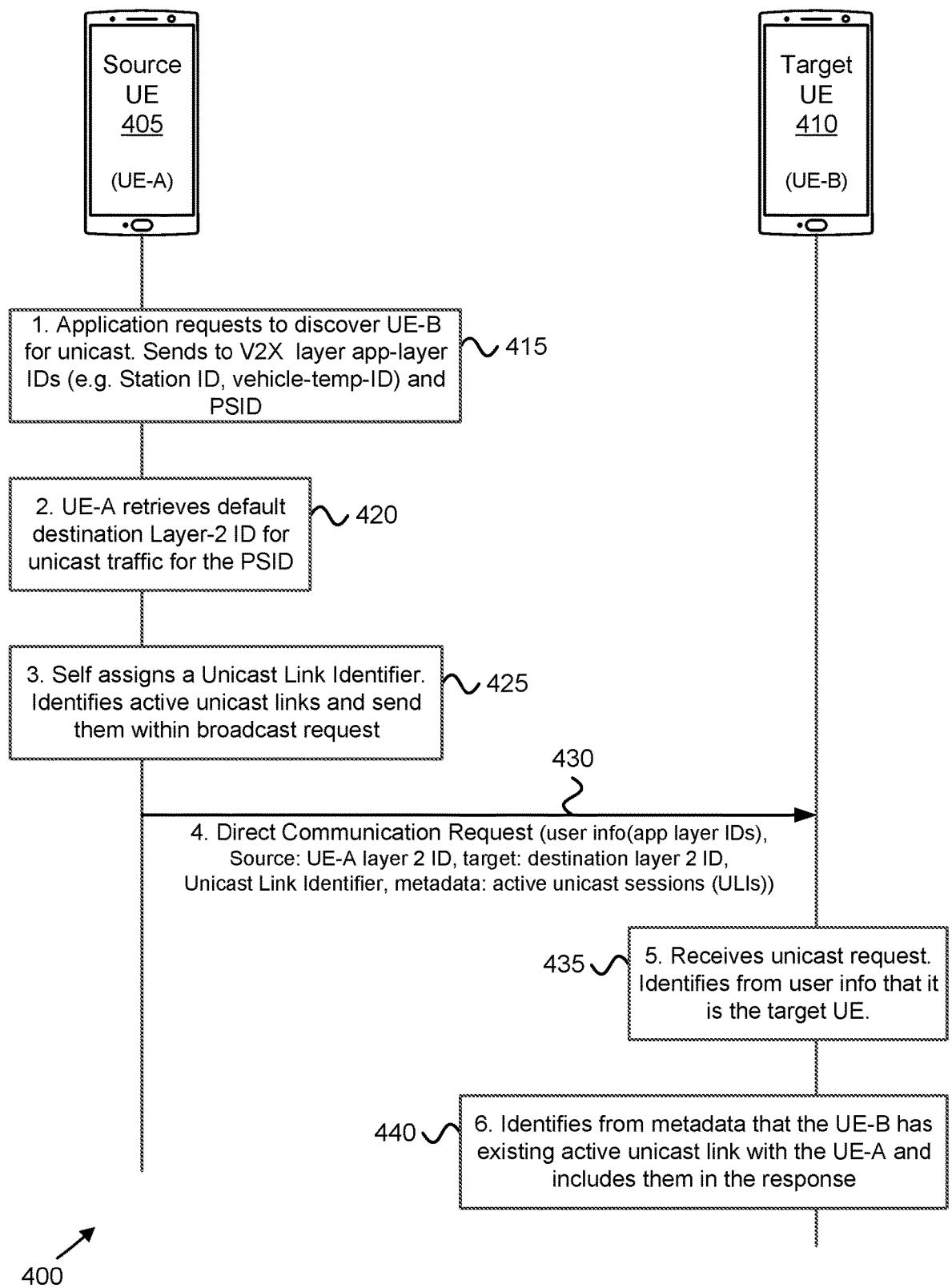
FIG. 4A is a diagram illustrating one embodiment of a procedure for re-using an existing unicast session for multiple V2X services between the same pair of UEs.
Figure 4B:
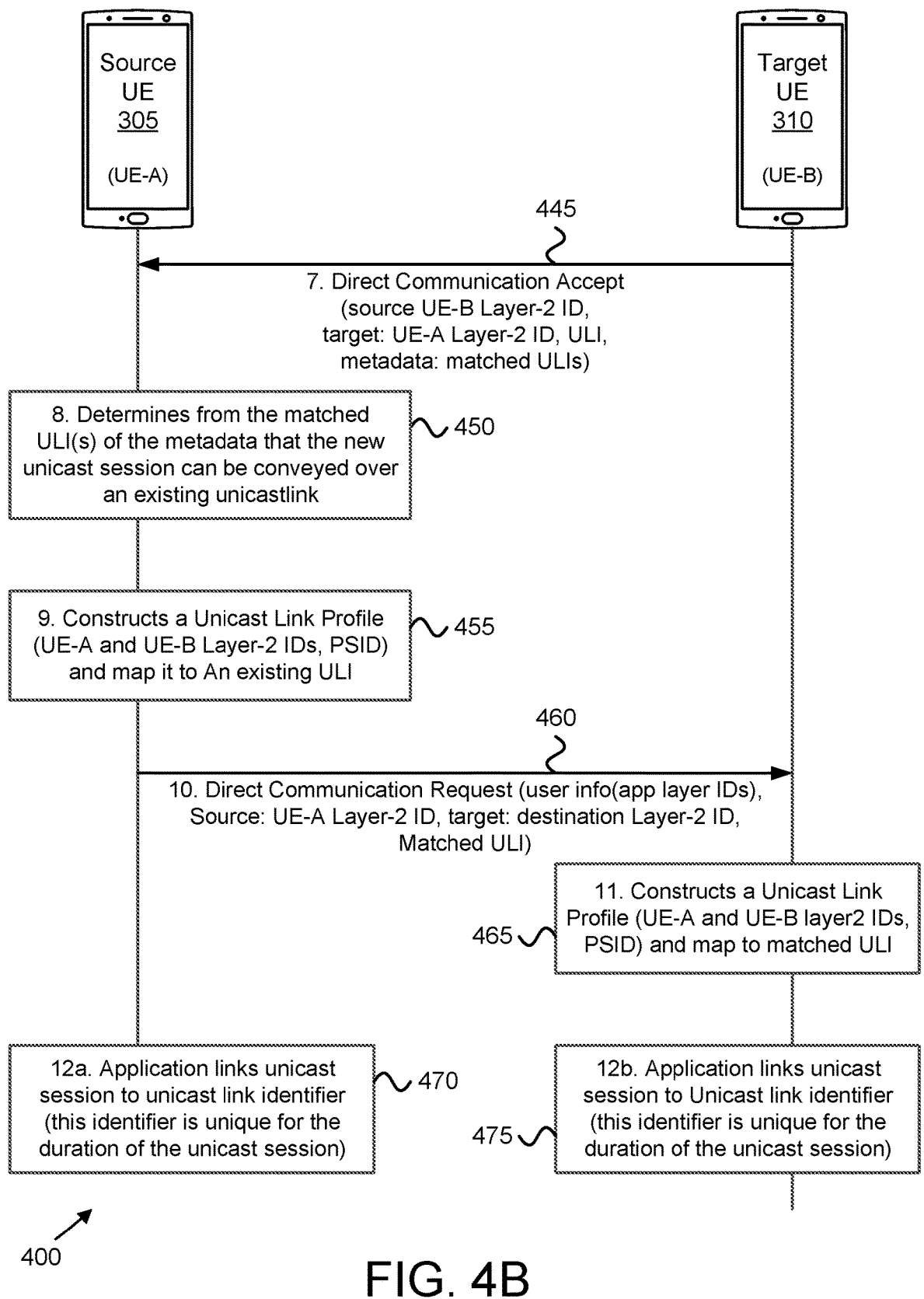
FIG. 4B continues the procedure of FIG. 4A.

FIG. 4A-4B depict a procedure 400 for determining whether an active unicast session can be re-used, according embodiments of the disclosure. The procedure 400 shows a source UE 405 re-using an existing unicast session for multiple V2X services between the same pair of UEs (i.e., source UE 405 and target UE 410). Here, the source UE 405 may be one embodiment of the UE-A 205, while target UE 410 may be one embodiment of the UE-B 210. FIGS. 4A-4B represent one example of a second solution for conveying unicast sessions over a direct communication link. The procedure 400 may extend the method 300 described above. In various embodiments, the source UE 405 may re-use an existing unicast session between the same pair of UEs when a V2X application requests to send a message over a unicast session of a different V2X service (e.g., different PSID).

In some embodiments, the source UE 405 initiating a new request for unicast session wherein the request includes existing active Unicast Link Identifiers as metadata. Here, the target UE 410 examines the Unicast Link Identifier(s) included in the request and determines whether an active unicast session already exists between the source UE 405 and the target UE 410. If the target UE 410 identifies a match, the target UE 410 includes in the unicast link session response the existing Unicast Link Identifiers ("ULIs"). Note that the matched ULIs may be the matched source and target application layer IDs. The source UE 405 examines the response and determines whether an existing unicast link session can be re-used.

At FIG. 4A, the procedure 400 begins in step 1 as an application (e.g., V2X application) in the source UE 405 requests to establish a unicast session for a V2X service (see block 415). The application includes in the request towards the V2X layer 220 of the source UE 405 the Application layer identifier of the source and target UEs (including the target UE 410).

In step 2, the source UE 405 retrieves the default destination Layer-2 ID for the V2X service (PSID) for establishing a unicast session (existing procedure) (see block 420).

In step 3, the source UE 405 self-assigns a new ULI (as the source UE 405 does not know at this time whether an existing unicast link can be reused or whether a new unicast link is to be established to the same target UE), identifies all active unicast links, and includes them in a new unicast link request as metadata (see block 425). In some embodiments, the metadata include target and source application layer identifiers.

In step 4, the source UE 405 initiates a request for unicast session by broadcasting a Direct Communication Request (see messaging 430). Here, the request includes: source Application-Layer identifier, target Application-Layer identifier, a source Layer-2 identifier (of source UE 405), a "default" destination Layer-2 ID (i.e., from step 2), the generated ULI and—as metadata—a set of unicast link identifiers identifying the active unicast session(s).

In step 5, the target UE 410 receives the unicast request and identifies from the application layer identifiers that it is the target of the Direct Communication Request (see block 435).

In step 6, the target UE 410 identifies from the metadata that at least one active unicast session already exists with the source UE. The target UE 410 includes all matched ULIs of the existing active unicast session(s) in the response (see block 440).

Continuing on FIG. 4B, at step 7 the target UE 410 responds to the unicast link request by sending a Direct Communication Accept message (see messaging 445). Here, the Direct Communication Accept message includes: the Layer-2 identifier for the target UE 410 as the message source layer-2 ID, the source UE 405's layer-2 ID as message target layer-2 ID, the generated ULI (of the source UE 405) and—as metadata—the matched ULI(s).

In step 8, the source UE 405 determines from the matched ULI(s) of the metadata that the new unicast session can be conveyed over an existing unicast link (see block 450).

In step 9, the source UE 405 constructs a Unicast Link Profile that include the Source Application-Layer ID, the Target Application-Layer ID, the layer-2 identifiers of the source UE 405 and target UE 410, the ULI and PSID. The source UE 405 associates the unicast link to the Unicast Link Identifier (see block 455).

In step 10, the source UE 405 indicates to the target UE 410 that the unicast session is sent over an existing link (see messaging 460). As depicted, this indication may be a Direct Communication Request that includes the ULI of the matched, existing unicast link.

In step 11, the target UE 410 constructs a unicast link profile and associate it to the existing ULI (see block 465). Here, the Unicast Link Profile may include the Source Application-Layer ID, the Target Application-Layer ID, the Layer-2 identifiers for the source UE 405 and target UE 410, ULI and PSID.

In steps 12a and 12b, both applications associate the unicast link to the Unicast link identifier (see blocks 470 and 475).

In one embodiment when a V2X application requests to initiate unicast session to convey a message of a specific V2X service (e.g., specific PSID), the source UE initiates a request for unicast communication over PC5, the UE includes in the request for a unicast session a PC5 link identifier. The PC5 link identifier may be self-generated by the transmitting UE and is signaled to the Target UE in the DCR message. When the target UE receive the request for unicast session over PC5, the UE identify if they are the target UEs by examining the application layer identifier included in the request.

If the UE identifies it is the target UE the UE self-assigns a PC5 link identifier and map it to the PC5 link identifier of the source UE. The target UE constructs a Unicast Link Profile including the source and target PC5 link identifiers, layer-2 addresses and application layer identifiers and maps the Unicast link profile to the source and target PC5 link identifiers. The target UE then responds to the source UE by including in the unicast link response over PC5 the source and target PC5 link identifiers. The source UE also creates a Unicast Link Profile that contain the source and target PC5 link identifiers, layer-2 addresses and application layer identifiers. The target UE maps the source and target PC5 link identifier to the unicast link profile. In one embodiment the source and target PC5 link identifier may identify the Unicast Link Identifier. Both source and target UEs also advertise such unicast link identifier to the application layer.

Figure 5A:
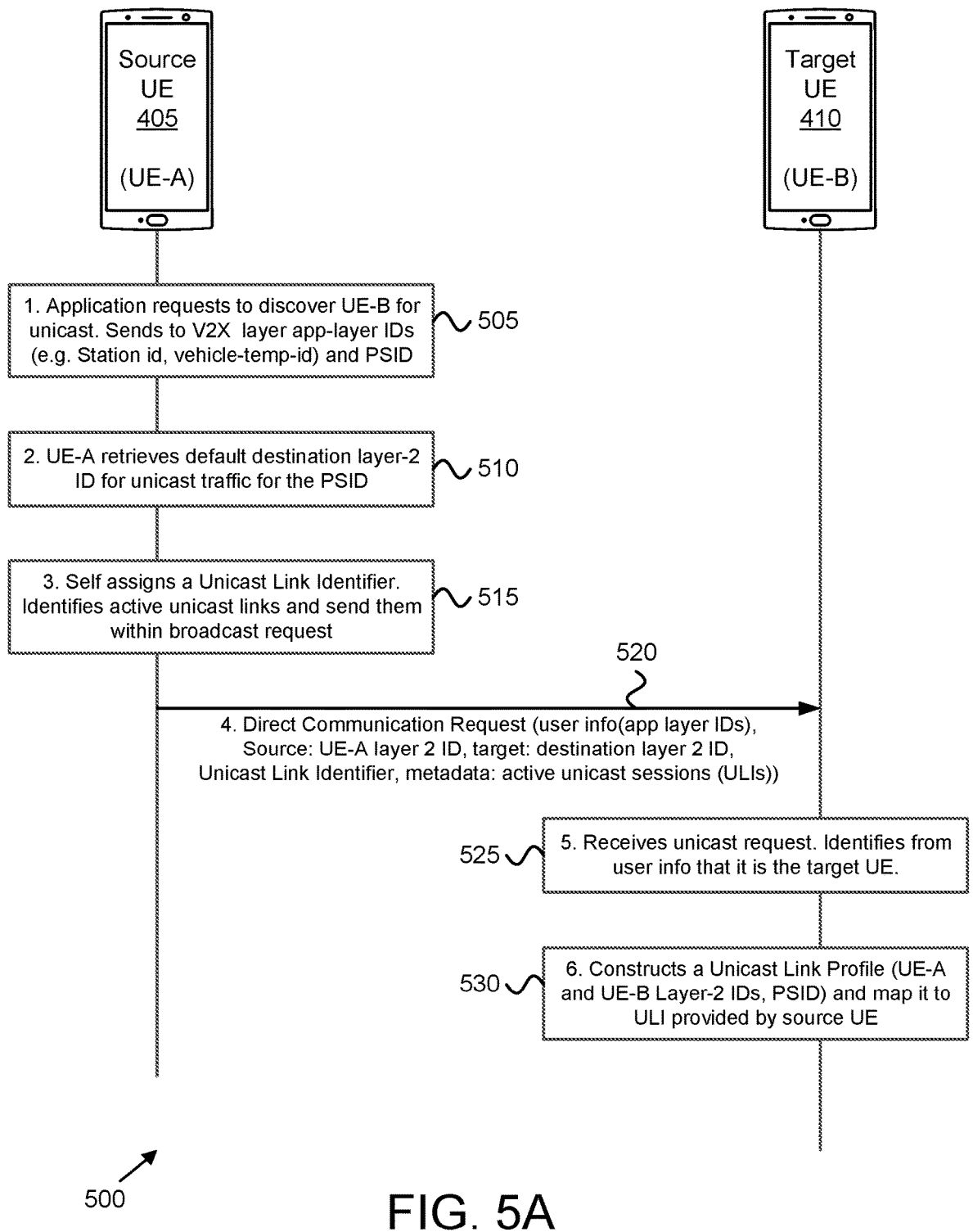
FIG. 5A is a diagram illustrating one embodiment of a procedure for re-using the same RRC connection to convey multiple unicast sessions of multiple V2X services.
Figure 5B:
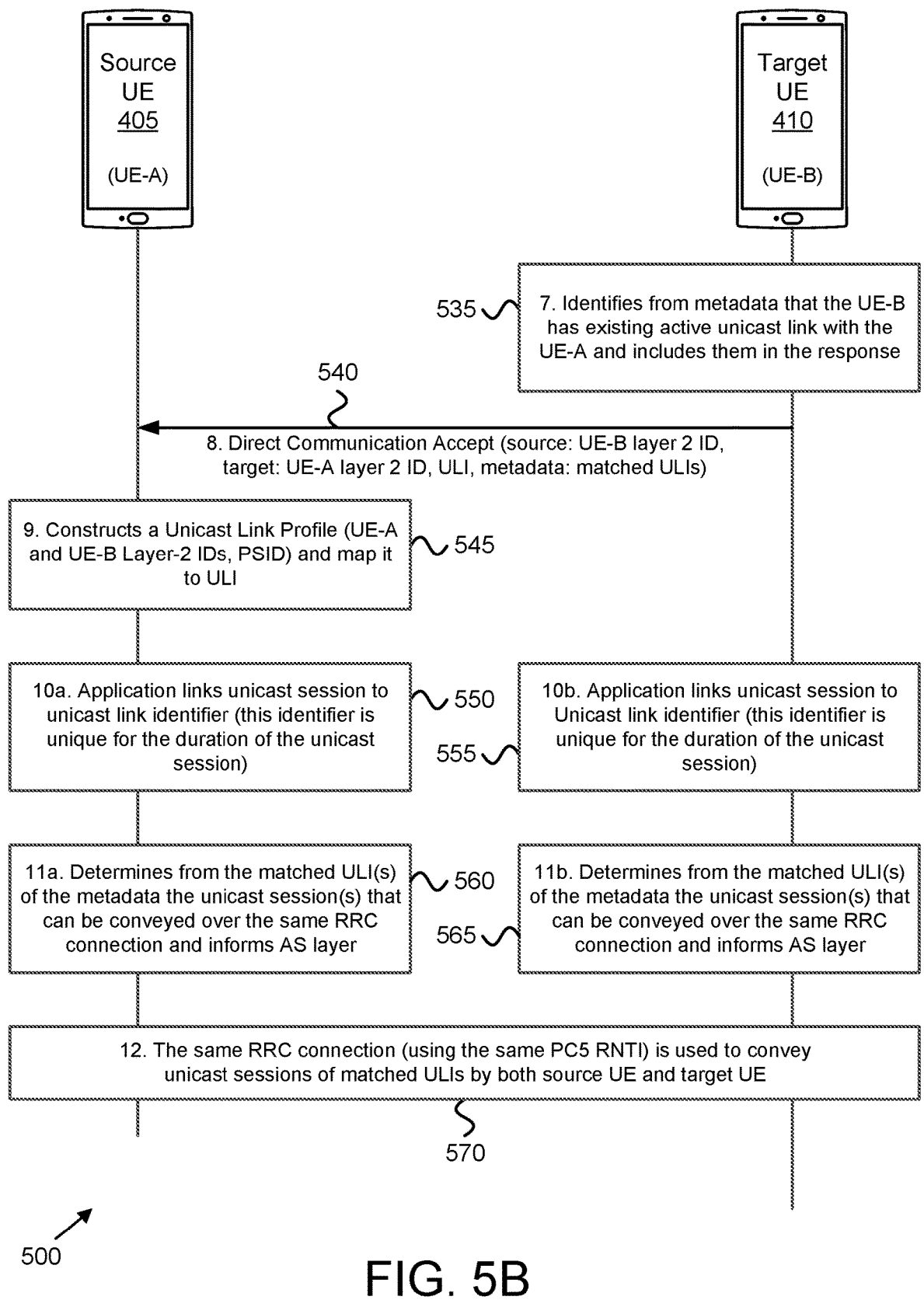
FIG. 5B continues the procedure of FIG. 5A.

FIGS. 5A-5B depicts a procedure 500 for determining whether an active unicast session can be re-used, according embodiments of the disclosure. The procedure 500 shows a source UE 405 re-using the same RRC connection to convey multiple unicast sessions of multiple V2X services to a target UE 510. FIGS. 5A-5B represent one example of a third solution for conveying multiple unicast sessions over a direct communication link. The procedure 500 may extend the method 300 described above.

At FIG. 5A, the procedure 500 begins in step 1 as an application (e.g., V2X application) in the source UE 405 requests to establish a unicast session for a V2X service (see block 505). Included in the request towards the V2X layer 220 of the UE are application layer identifiers of the source and target UEs and a PSID.

In step 2, the source UE 405 retrieves the default destination layer-2 ID for the V2X service (PSID) for establishing a unicast session (see block 510).

In step 3, the source UE 405 may self-assign a new ULI (as the source UE 405 may be unaware whether the unicast link is to be established to the same target UE 410). Additionally, the source UE 405 may identify all active unicast links and include an identifier for each active unicast link as metadata in a new unicast link request (see block 515).

In step 4, the source UE 405 initiates a request for unicast session by broadcasting a Direct Communication Request (see messaging 520). Here, the request includes: source and target Application-Layer identifiers, a source Layer-2 identifier, a "default" destination Layer-2 ID (i.e., from step 2), the generated ULI and—as metadata—a set of unicast link identifiers identifying the active unicast session(s).

In step 5, the target UE 410 receives the unicast request and identifies from the application layer identifiers that it is the target of the Direct Communication Request (see block 335).

In step 6, the target UE 410 constructs a Unicast Link Profile that include the Source Application-Layer ID, the Target Application-Layer ID, the Layer-2 identifier for the source UE 405, the "actual" Layer-2 identifier for the target UE 410, ULI and PSID. The target UE 410 associates the unicast link ULI provided by the source UE 405 (see block 530).

Continuing at FIG. 5B, at step 7 the target UE 410 also identifies from the Direct Communication Request whether the target UE 410 has existing active unicast session(s) with the source UE 405 and includes all matched ULIs in the response (see block 535).

In step 8, the target UE 410 responds to the unicast link request by sending a Direct Communication Accept message (see messaging 540). Here, the Direct Communication Accept message includes: the "actual" Layer-2 identifier for the target UE 410 as the message source layer-2 ID, the source UE 405's layer-2 ID as message target layer-2 ID, the generated ULI (of the source UE 405) and—as metadata—the matched ULI(s).

In step 9, the source UE 405 also constructs a Unicast Link Profile that include the Source Application-Layer ID, the Target Application-Layer ID, the layer-2 identifiers of the source UE 405 and target UE 410, the ULI and PSID. The source UE 405 associates the unicast link to the Unicast Link Identifier (see block 545).

In steps 10a and 10b, both applications associate the unicast link to the Unicast link identifier (see blocks 450 and 455).

In steps 11a and 11b, the source UE 405 and target UE 410 determine from the matched ULIs that the matched unicast session(s) can be provided over the same RRC connection between the two UEs (see blocks 460 and 465).

In step 12, the AS layer 225 sends data from the unicast sessions that have matched ULIs over an RRC connection using the same PC5 RNTI. This is applicable for the source-UE-to-target-UE direction as well as the target-UE-to-source-UE direction.

In one embodiment the V2X layer 220 associates the unicast sessions of matched ULIs to one link profile (i.e., link is related to the same pair of source and target UE). The V2X layer 220 informs the AS layer 225 of the unicast sessions that are associated to the same target UE 410. The AS layer 225 sends data from the unicast sessions that have matched ULIs over an RRC connection using the same PC5 RNTI. This is applicable for the source-UE-to-target-UE direction as well as the target-UE-to-source-UE direction.

According to a fourth solution for conveying unicast sessions over a direct communication link, a source UE may create a random number of bits—e.g., 16 bits—(referred to as 'ULI-x') and send the ULI-x to the target UE along with metadata. Recall that both the procedure 400 and the procedure 500 include exchanging metadata, e.g., in the direct communication request and direct communication response. According to this fourth solution, the metadata includes all the ULIs (e.g., ULI-a, ULI-b, etc.) and the target verifies if it identifies one of the received ULIs.

If yes, then the same ULI (e.g., ULI-a) is used for the second session as well. If not, then the identifier 'ULI-x' is adopted by the target and indicates acceptance back to the source. Both source and target UEs update their metadata accordingly. In one embodiment, a UE updates its metadata by adding the new session ID related Layer-2 source and destination IDs to the exiting profile for ULI-a. In another embodiment, a UE updates its metadata by creating a new context with ULI-x for the newly created session and adding Layer-2 source and destination IDs. Where an already-existing unicast session cannot be re-used, the ULI-x is passed on to Access Stratum—and Access Stratum creates a PC5-RNTI based on this. This may be done by either adopting the entire ULI (ULI-x in current example), adopting part of it (say 8 MSB bits) and appending 8 randomly generated bits or even by only generating the PC5-RNTI with 16 randomly generated bits.

In the above embodiments, 16 bits are just taken as an example but any other bit length for the concerned IDs is also possible. The length of the identities must be sufficient to minimize the probability of any two UEs (from a large set of UEs in a dense traffic situation) generating the same random identity. If collision happens (e.g., more than one transmitter UE concurrently use the same randomly generated identity towards the same destination UE), then the Upper layers of any of the involved UEs (the transmitter UE(s) and/or receiver UE) may detect that the received V2X message is not intended for them, e.g., based on Station ID, temporary UE identity, application ID or something similar.

In this case, the UE that detects the collision may send a Unicast PC5-S and/or PC5-RRC message including the colliding identity in question (ULI and/or PC5-RNTI) indicating the recipient to discard the identity (or identities) in question and start afresh by generating a new random number. As one optimization, only the sender of the previous message where collision was detected, is informed of the collision and this sender is then responsible for starting afresh by generating a new random number towards the (default) destination ID for the corresponding PC5-S link.

The PC5-RNTI is carried in each of the PC5-RRC message and the target responds back with PC5-RRC message including the same PC5-RNTI. Part of (or entire) PC5-RNTI can also be used at the physical layer (e.g., in SCI) for enabling filtering at the target UEs.

Note that the PC5 RNTI (RRC connection on PC5) can be explicitly released by either of the UEs when all V2X applications terminate and upper layer identities (Application identities, L2-identities, PLIs and/or ULIs) need to be released or, implicitly upon expiry of a timer used to monitor inactivity.

In any of the above solutions, instead of transmitting the ULI of the active unicast sessions as metadata in cleartext, the source UE transmits a hashed version of such identifiers. Here, both source and target UEs must use the same hashing function.

In any of the above solutions, the source or target UE determines if the existing unicast session can be re-used if both V2X services operate on the same mode of operation (e.g., both in-coverage or both out of-coverage).

In any of the above solutions, if one unicast session is lost, then both UEs may recover the unicast session by advertising the unicast link identifier of all active unicast sessions. The UEs transmit the unicast link identifiers based on a pre-configured timer. If the timer expires, then the UEs delete the unicast link identifier and the associated Unicast Link Profile.

In any of the above solutions, instead of the source UE transmitting the active ULIs as metadata (e.g., step 4 in procedures 400, 500), the target UE may include in the DCR response all active ULIs (the advantage is that such approach does not require to transmit all active ULIs in broadcast). Here, the source UE determines from the active ULI if there are any existing active ULIs and informs the AS layer that the same RRC connection can be used (embodiment 1) and/or informs the target UE that the same unicast session can be used (embodiment 2).

In any of the above solutions, the ULI identifier corresponds to the source and target Layer-2 IDs of the source and target UE.

According to a fifth solution for conveying unicast sessions over a direct communication link, the transmitter and received UEs solicit and provide PC5 HARQ feedback for the PSSCH transmissions made by the transmitter UE (i.e., source UE) to one or more receiver UE(s). In various embodiments, the transmitter UE gets to know the total number of member UEs in the group based on Upper layer information, e.g., the upper layer(s) provide the total number of UEs in the group to the lower layer(s). Here, this knowledge at the Physical layer is accurate to the extent required for physical layer functioning at any given point in time; even if the group members are updated, the Physical layer is informed in a reasonably quick time frame.

For SL unicast and groupcast, HARQ feedback and HARQ combining in the physical layer may be supported. In various embodiments, HARQ-ACK feedback for a PSSCH is carried in SFCI format(s) via PSFCH in resource allocation Modes 1 and 2.

When SL HARQ feedback is enabled for unicast, in the case of non-CBG operation the receiver UE generates HARQ-ACK if it successfully decodes the corresponding TB. It generates HARQ-NACK if it does not successfully decode the corresponding TB after decoding the associated PSCCH targeted to the receiver UE.

When SL HARQ feedback is enabled for groupcast, it is supported to use TX-RX distance and/or RSRP in deciding whether to send HARQ feedback. In the case of non-CBG operation, two options are supported:

According to SL HARQ feedback Option 1, the Receiver UE (i.e., target UE) transmits HARQ-NACK on PSFCH if it fails to decode the corresponding TB after decoding the associated PSCCH and transmits no signal on PSFCH otherwise (i.e., the Rx UE does not transmit HARQ-ACK on PSFCH if it successfully decodes the corresponding TB).

According to SL HARQ feedback Option 2, the Receiver UE ("Rx UE") transmits HARQ-ACK on PSFCH if it successfully decodes the corresponding TB. Additionally, the Rx UE transmits HARQ-NACK on PSFCH if it does not successfully decode the corresponding TB after decoding the associated PSCCH which targets the receiver UE.

Based on the knowledge of total number of member UEs in the group, the Physical layer of a transmitter UE may determine the amount of feedback resources required. The determination of required feedback resources will be according to the Physical layer structure still to be finalized in 3GPP. The transmitter UE, having made this determination, will compare the number of group member UEs, amount of feedback resources available and the reliability required for a particular V2X message. The reliability is directly derivable from the VQI/priority indicated by Upper layer for the corresponding Packet for transmission. As an example, if the reliability required is 5 '9 s' e.g., as for "Emergency trajectory alignment between UEs supporting V2X application" and "Sensor information sharing between UEs supporting V2X application scenarios" then only feedback Option 2 must be used. For lesser-required reliability, option 1 alone can be used if the total number of member UEs in the group is higher compared with available feedback resources; or, a mix of Option 1 and Option 2 can be used.

The actual utilized resources for HARQ feedback can be less compared to what has been determined by the transmitter, as indicated above. This is since only the receiver UE(s) that are inside the MCR (Minimum Communication Range) are required to provide the HARQ feedback. This may at first sound like a resource wastage but indeed avoids much complexity that would arise if the transmitter had to beforehand know the real-time distance of each of the receiver UE.

A detailed (transmitter) UE behavior is revealed for selecting between Option 1, Option 2 (or a mix) considering the following three aspects: 1) total number of member UEs in the group, 2) amount of available HARQ feedback resources, and 3) reliability required for corresponding V2X PSSCH packet transmission.

A different threshold for each of those items may lead to a combination that uses either option or uses a certain mix of these.

As a first example, if Reliability>Threshold_reliability, then use Option 2 for as many UEs as possible. In case of shortage of feedback resources use Option 1 for remaining UEs, closer to the transmitter—based on distance_threshold. The distance_threshold is calculated as a ratio of remaining UEs to the total receiver UEs in the group multiplied by MCR (Minimum Communication Range).

As a second example, if Reliability<Threshold_reliability and number of total receiver UEs in the group is more than threshold_max_option2, then use Option 1.

In Mode 1 V2X communication (i.e., network-scheduled NR-based V2X), the transmitter UE needs to ask for the feedback resources from the gNB in addition to (re)transmission resources. For this reason, the transmitter UE needs to inform the gNB on the number of member UEs in the group destination where the transmitter would like to send intended V2X message(s). This information along with the size of the V2X message, periodicity etc. needs to be informed to the gNB for each of the group destination where the transmitter intends to make transmissions. This information can be carried in messages similar to Sidelink UE information and/or NR UE Assistance information as defined in LTE RRC (36.331) specification. These messages carry the number of member UEs in a group, corresponding size of the V2X message, periodicity, priority/VQI etc. for each group where a transmitter is interested in transmitting data to the gNB.

Upon receiving the UE request, the gNB provides the transmission resources and PC5 HARQ feedback time-frequency and code resources accordingly in Mode 1 V2X communication. As a signaling optimization, the feedback resources can be linked with PSSCH transmission resources using certain time-frequency offset. All the codes can be used by the transmitter UE, or the same can be explicitly signaled by the gNB to the transmitter.

The amount of PC5 feedback resources for retransmission can be same as that for PC5 feedback resources for transmission, obtained in a similar way as for transmission, as described above. Therefore, in Mode 1 V2X communication, the time-frequency PC5 HARQ feedback resources for (re)-transmission are obtained either explicitly from gNB or using an offset with respect to the PSSCH resources. For PC5 HARQ feedback transmission, either all the codes can be used by the transmitter UE, or the same can be explicitly signaled by the gNB to the transmitter.

The transmitter UE needs to allocate the feedback resources to the group member UEs. This can be done using PC5 RRC where the transmitter semi statically configures the UEs with either/both Option 1, Option 2 resources. Actual usage of option (either/both) and the corresponding condition (e.g., Tx-Rx distance less than certain Threshold_A use Option 1, rest Option B) are controlled and indicated in SCI and depends among others on reliability/priority of the transmission.

Figure 6:
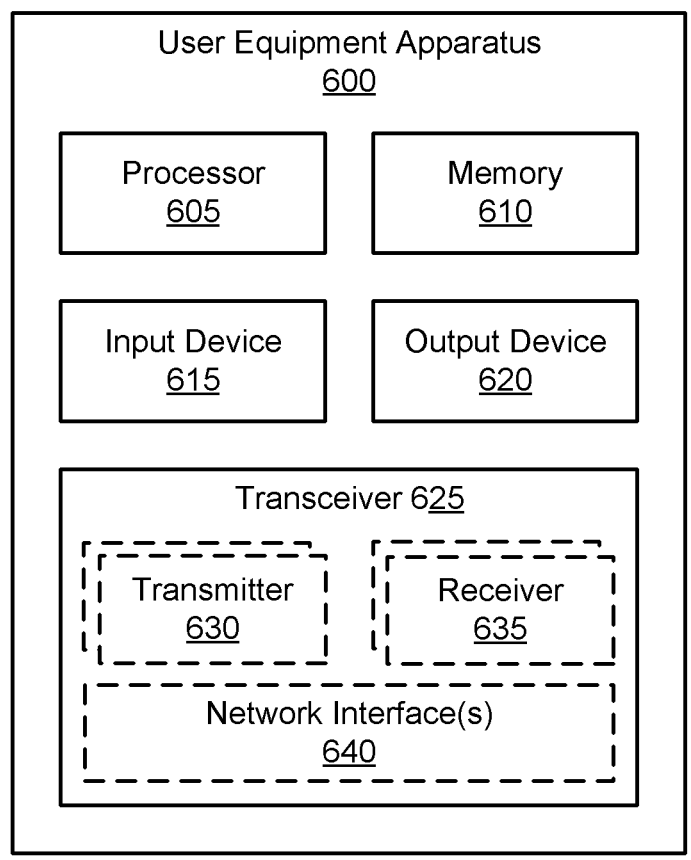
FIG. 6 is a diagram illustrating one embodiment of a user equipment apparatus that may be used for determining whether an active unicast session can be re-used.

FIG. 6 depicts a user equipment apparatus 600 that may be used for determining whether an active unicast session can be re-used, according to embodiments of the disclosure. In various embodiments, the user equipment apparatus 600 is used to implement one or more of the solutions described above. The user equipment apparatus 600 may be one embodiment of the remote unit 105, the UE-A 205, and/or the source UE 405, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In some embodiments, the processor 605 that receives, e.g., from an internal application or operating system, a first request to establish a unicast session over a direct communication link to a first UE (i.e., target UE). Here, the first request indicates a source application-layer identifier of the apparatus and a target application-layer identifier of the target UE. The processor 605 determines determining whether an active unicast session between the source application-layer identifier and the target application-layer identifier already exists.

If an active unicast session between the source application-layer identifier and the target application-layer identifier already exists, then the processor 605 re-uses the already-existing active unicast session between the apparatus 600 and the target UE. Otherwise, if an active unicast session between the source application-layer identifier and the target application-layer identifier does not already exist, then the processor 605 establishes a new unicast session between the apparatus 600 and the target UE.

In some embodiments, the first request is for a first V2X service and wherein the already-existing active unicast session is associated with a second V2X service different than the first, wherein the processor 605 modifies a Unicast Link Profile of the already-existing active unicast session to add the first V2X service. In certain embodiments, the Unicast Link Profile is associated with an RRC connection, wherein re-using the already-existing active unicast session further comprises re-using an existing RRC connection between the apparatus 600 and the target UE.

In some embodiments, the processor 605 generates a link identifier for the requested unicast session. In such embodiments, the link identifier maps the source and target application-layer identifiers to the unicast session.

In some embodiments, the processor 605 transmits a second request to the target UE to establish a unicast session and receives a response from the target UE, the response containing a set of link identifiers. In such embodiments, determining whether an active unicast session between the source application-layer identifier and the target application-layer identifier already exists already exists is based on the response from the target UE. In certain embodiments, the response from the includes as metadata all existing active unicast sessions of the target UE.

In some embodiments, the processor 605 maintains a second set of link identifiers of the apparatus, each link identifier associated with a pair of source and target application-layer identifiers, wherein determining from the response whether an active unicast session with the target UE already exists comprises determining whether a matching link identifier exists among the set of link identifiers contained in the response and the second set of link identifiers.

In certain embodiments, the second request includes as metadata the second set of link identifiers. In certain embodiments, the response includes an indication of matching link identifiers. In certain embodiments, re-using the already-existing active unicast session comprises selecting a matching link identifier and constructing a Unicast Link Profile that maps the unicast session requested in the first request to the already-existing active unicast session.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to SL HARQ operation. For example, the memory 610 may store V2X communication resources, ULI, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to send messages to the RAN, as described herein. Similarly, one or more receivers 635 may be used to receive messages from the RAN, as described herein. Although only one transmitter 630 and one receiver 635 are illustrated, the user equipment apparatus 600 may have any suitable number of transmitters 630 and receivers 635. Further, the transmitter(s) 625 and the receiver(s) 630 may be any suitable type of transmitters and receivers.

Disclosed herein is a first apparatus for determining whether an active unicast session can be re-used, according to embodiments of the disclosure. The first apparatus may be implemented by a source UE, such as the remote unit 105, the UE-A 205, the source UE 405, and/or the user equipment apparatus 600. The first apparatus includes a transceiver and a processor that receives, e.g., from an internal application or operating system, a first request to establish a unicast session over a direct communication link to a first UE (i.e., target UE). Here, the first request indicates a source application-layer identifier of the apparatus and a target application-layer identifier of the first UE. The processor determines determining whether an active unicast session between the source application-layer identifier and the target application-layer identifier already exists. The processor re-uses an already-existing active unicast session between the apparatus and the first UE in response to determining that an active unicast session between the source application-layer identifier and the target application-layer identifier already exists. Otherwise, the processor establishes a new unicast session between the apparatus and the first UE in response to determining that an active unicast session between the source application-layer identifier and the target application-layer identifier does not exist.

In some embodiments, the first request is for a first V2X service and wherein the already-existing active unicast session is associated with a second V2X service different than the first, wherein the processor modifies a Unicast Link Profile of the already-existing active unicast session to add the first V2X service. In certain embodiments, the Unicast Link Profile is associated with an RRC connection, wherein re-using the already-existing active unicast session further comprises re-using an existing RRC connection between the apparatus and the first UE.

In some embodiments, the processor generates a link identifier for the requested unicast session. In such embodiments, the link identifier maps the source and target application-layer identifiers to the unicast session.

In some embodiments, the processor transmits a second request to the first UE to establish a unicast session and receives a response from the first UE, the response containing a set of link identifiers. In such embodiments, determining whether an active unicast session between the source application-layer identifier and the target application-layer identifier already exists already exists is based on the response from the first UE. In certain embodiments, the response from the includes as metadata all existing active unicast sessions of the first UE.

In some embodiments, the processor maintains a second set of link identifiers of the apparatus, each link identifier associated with a pair of source and target application-layer identifiers, wherein determining from the response whether an active unicast session with the first UE already exists comprises determining whether a matching link identifier exists among the set of link identifiers contained in the response and the second set of link identifiers.

In certain embodiments, the second request includes as metadata the second set of link identifiers. In certain embodiments, the response includes an indication of matching link identifiers. In certain embodiments, re-using the already-existing active unicast session comprises selecting a matching link identifier and constructing a Unicast Link Profile that maps the unicast session requested in the first request to the already-existing active unicast session.

Disclosed herein is a first method for determining whether an active unicast session can be re-used, according to embodiments of the disclosure. The first method may be performed by a source UE, such as the remote unit 105, the UE-A 205, the source UE 405, and/or the user equipment apparatus 600. The first method includes receiving, from an internal application (e.g., a V2X application or OS running on the source UE), a first request to establish a unicast session over a direct communication link to a target UE (i.e., a second UE). Here, the first request indicates a source application-layer identifier of the source UE and a target application-layer identifier of the target UE. The first method includes determining whether an active unicast session between the source application-layer identifier and the target application-layer identifier already exists. The first method includes re-using an already-existing active unicast session between the source UE and the target UE in response to determining that an active unicast session between the source application-layer identifier and the target application-layer identifier already exists. Otherwise, the first method includes establishing a new unicast session between the source UE and target UE in response to determining that an active unicast session between the source application-layer identifier and the target application-layer identifier does not exist.

In some embodiments, the first request is for a first V2X service and the already-existing active unicast session is associated with a second V2X service different than the first. In such embodiments, the first method includes modifying a Unicast Link Profile of the already-existing active unicast session to add the first V2X service. In certain embodiments, the Unicast Link Profile is associated with an RRC connection. In such embodiments, re-using the already-existing active unicast session further comprises re-using an existing RRC connection between the source UE and the target UE.

In some embodiments, the first method includes generating a link identifier for the requested unicast session. In such embodiments, the link identifier maps the source and target application-layer identifiers to the unicast session.

In some embodiments, the first method further includes transmitting a second request to the target UE to establish a unicast session and receiving a response from the target UE, the response containing a set of link identifiers (e.g., a set of ULIs). In such embodiments, determining whether an active unicast session between the source application-layer identifier and the target application-layer identifier already exists already exists is based on the response from the target UE. In certain embodiments, the response from the includes as metadata all existing active unicast sessions of the target UE.

In some embodiments, the first method further includes maintaining a second set of link identifiers of the source UE, each link identifier associated with a pair of source and target application-layer identifiers. In such embodiments, determining from the response whether an active unicast session with the target UE already exists includes determining whether a matching link identifier exists among the set of link identifiers contained in the response and the second set of link identifiers.

In certain embodiments, the second request includes as metadata the second set of link identifiers. In certain embodiments, the response includes an indication of matching link identifiers. In certain embodiments, re-using the already-existing active unicast session comprises selecting a matching link identifier and constructing a Unicast Link Profile that maps the unicast session requested in the first request to the already-existing active unicast session.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A user equipment (UE), comprising:
at least one memory; and
at least one processor coupled with the at least one memory and configured to cause the UE to:
receive a sidelink grant for sidelink communication, wherein the sidelink grant is associated with a number of candidate feedback resources, and wherein hybrid automatic repeat request (HARQ) feedback is enabled for groupcast sidelink communication;
select a HARQ feedback mode for the sidelink communication based at least in part on a group size of a group of UEs, including the UE, and the number of candidate feedback resources;
determine a range requirement for the sidelink communication based at least in part on the selected HARQ feedback mode; and
perform the sidelink communication according to one or more of the selected HARQ feedback mode or the determined range requirement for the sidelink communication.

2. The UE of claim 1, wherein the HARQ feedback mode comprises a negative-acknowledgement only mode or a positive-and-negative acknowledgment mode.

3. The UE of claim 1, wherein the at least one processor is configured to cause the UE to transmit a semi-static configuration of physical sidelink feedback channel (PSFCH) resources.

4. The UE of claim 3, wherein the semi-static configuration indicates a condition for using a respective HARQ feedback mode.

5. The UE of claim 1, wherein the at least one processor is configured to cause the UE to transmit sidelink control information (SCI) indicating that a first HARQ feedback mode is to be used based on a transmitter-receiver distance satisfying a threshold.

6. The UE of claim 1, wherein the at least one processor is configured to cause the UE to transmit sidelink control information (SCI) indicating that a first HARQ feedback mode is to be used based on a priority of the sidelink communication satisfying a threshold.

7. The UE of claim 1, wherein the at least one processor is configured to cause the UE to determine a reliability requirement corresponding to the sidelink communication, and wherein to select the HARQ feedback mode, the least one processor is configured to cause the UE to select further based on the reliability requirement.

8. The UE of claim 7, wherein the at least one processor is configured to cause the UE to transmit sidelink control information (SCI) indicating that a first HARQ feedback mode is to be used based on the reliability requirement satisfying a threshold.

9. The UE of claim 8, wherein the threshold is based on a minimum communication range (MCR) associated with the sidelink communication.

10. The UE of claim 7, wherein to select the HARQ feedback mode, the at least one processor is configured to cause the UE to:
assign a first HARQ feedback mode to a subset of the group of UEs based at least in part on the reliability requirement satisfying a threshold; and
assign a second HARQ feedback mode to a remainder of the group of UEs,
wherein the HARQ feedback mode comprises a positive-and-negative acknowledgment mode and the second HARQ feedback mode comprises a negative-acknowledgement only mode.

11. A processor for wireless communication, comprising:
at least one controller coupled with at least one memory and configured to cause the processor to:
receive a sidelink grant for sidelink communication, wherein the sidelink grant is associated with a number of candidate feedback resources, and wherein hybrid automatic repeat request (HARQ) feedback is enabled for groupcast sidelink communication;
select a HARQ feedback mode for the sidelink communication based at least in part on a group size of a group of UEs and the number of candidate feedback resources;
determine a range requirement for the sidelink communication based at least in part on the selected HARQ feedback mode; and
perform the sidelink communication according to one or more of the selected HARQ feedback mode or the determined range requirement for the sidelink communication.

12. The processor of claim 11, wherein the HARQ feedback mode comprises a negative-acknowledgement only mode or a positive-and-negative acknowledgment mode.

13. The processor of claim 11, wherein the at least one controller is configured to cause the processor to transmit a semi-static configuration of physical sidelink feedback channel (PSFCH) resources, and wherein the semi-static configuration indicates a condition for using a respective HARQ feedback mode.

14. The processor of claim 11, wherein the at least one controller is configured to cause the processor to transmit sidelink control information (SCI) indicating that a first HARQ feedback mode is to be used based on a transmitter-receiver distance satisfying a threshold.

15. The processor of claim 11, wherein the at least one controller is configured to cause the processor to transmit sidelink control information (SCI) indicating that a first HARQ feedback mode is to be used based on a priority of the sidelink communication satisfying a threshold.

16. The processor of claim 11, wherein the at least one controller is configured to cause the processor to determine a reliability requirement corresponding to the sidelink communication, and wherein to select the HARQ feedback mode, the least one controller is configured to cause the processor to select further based on the reliability requirement.

17. The processor of claim 16, wherein the at least one controller is configured to cause the processor to transmit sidelink control information (SCI) indicating that a first HARQ feedback mode is to be used based on the reliability requirement satisfying a threshold.

18. The processor of claim 17, wherein the threshold is based on a minimum communication range (MCR) associated with the sidelink communication.

19. The processor of claim 16, wherein to select the HARQ feedback mode, the at least one controller is configured to cause the processor to:
assign a first HARQ feedback mode to a subset of the group of UEs based at least in part on the reliability requirement satisfying a threshold; and
assign a second HARQ feedback mode to a remainder of the group of UEs,
wherein the HARQ feedback mode comprises a positive-and-negative acknowledgment mode and the second HARQ feedback mode comprises a negative-acknowledgement only mode.

20. A method performed by a user equipment (UE), the method comprising:
receiving a sidelink grant for sidelink communication wherein the sidelink grant is associated with a number of candidate feedback resources, and wherein hybrid automatic repeat request (HARQ) feedback is enabled for groupcast sidelink communication;
selecting a HARQ feedback mode for the sidelink communication based at least in part on a group size of a group of UEs, including the UE, and the number of candidate feedback resources;
determining a range requirement for the sidelink communication based at least in part on the selected HARQ feedback mode; and
performing the sidelink communication according to one or more of the selected HARQ feedback mode or the determined range requirement for the sidelink communication.

* * * * *